United States Patent [19]

Fenderson

[11] Patent Number: 5,022,451

[45] Date of Patent: Jun. 11, 1991

[54] APPARATUS AND METHODS FOR PROMOTING THE INFLATION OF TIRES

[76] Inventor: William D. Fenderson, 2004 Badger Rd., North Pole, Ak. 99705-5404

[21] Appl. No.: 402,906

[22] Filed: Sep. 1, 1989

[51] Int. Cl.$^5$ ............................................. B60C 25/06
[52] U.S. Cl. ........................................ 157/1; 157/1.2; 157/1.33
[58] Field of Search ........... 157/1.2, 1, 1.1, 1.33–1.42, 157/1.17; 152/410

[56] References Cited

U.S. PATENT DOCUMENTS 4,043,375  8/1977  Casey .................................. 152/410

*Primary Examiner*—D. S. Meislin
*Attorney, Agent, or Firm*—Hughes & Multer

[57] ABSTRACT

Methods of and apparatus for facilitating the inflation of tires mounted on split rims. Gripper devices are fixed to the outer flange ring of the split rim at equidistantly spaced intervals therearound, and generally equal forces are exerted on these devices to pull the bead seat ring of the rim toward the outer end of the rim. This: (1) seats the bead seat ring on an O-ring surrounding the bead seat to keep air from leaking between the bead seat and bead seat ring, and (2) displaces the outer flange ring away from the outer bead of the tire so that the bead can move toward the outer end of the rim and the tire thereby freely expand as air is pumped into the tire.

5 Claims, 5 Drawing Sheets

APPARATUS AND METHODS FOR PROMOTING THE INFLATION OF TIRES

TECHNICAL FIELD OF THE INVENTION

The present invention relates to methods and apparatus which can be used to advantage to promote the inflation of tires mounted on split-type rims.

BACKGROUND OF THE INVENTION

Tires of larger sizes are commonly mounted on split rims to facilitate the mounting, repair, and replacement of the tire. Split rims have an annular bead seat on which the inner bead of the tire is seated, a bead seat ring on which the tire's outer bead is mounted, inner and outer flange rings surround the bead seat and bead seat ring against which the inner and outer beads of the tire are seated, and O-ring surrounding the bead seat toward the outer end of the latter and confined between the bead seat and bead seat ring to keep air from escaping through the gap between the just-named components, and a locking ring surrounding the outer end of the bead seat.

In the course of repairing or replacing a tire mounted on a split rim of the character just described, those bonds of the mounted tire with the bead seat ring and the outer flange ring are broken. Then the outer bead, outer flange ring, and bead seat ring are translated toward the inner end of the rim, allowing the locking ring to be removed. This is followed by removal of the bead seat ring and the tire, if it is to be replaced or the repaired off the rim.

Apparatus for breading the bead so that a tire can be removed from a split rim is disclosed in U.S. Pat. Nos.: 3,500,891 issued 17 Mar. 1970 to Collins for HEAVY EQUIPMENT TIRE REPAIR DEVICE; 3,850,221 issued 26 Nov. 1974 to Zrostlik et al. for TIRE CHANGING TOOL; AND 3,971,426 issued 27 Jul. 1976 West et al. for APPARATUS FOR CHANGING GIANT TIRES IN THE FIELD.

In the course of repairing or replacing the tire the bead seat ring will typically be telescoped over the bead seat ring will typically be telescoped over the bead seat to the extent that the O-ring between these two components is exposed. This allows the O-ring to be inspected and replaced, if necessary. However, this leaves the bead seat ring in a position in which it can interfere with the inflation of a repaired or replacement tire. For example, it can hinder the movement of the tire's outer bead toward the outer end of the rim as air is pumped into the tire by catching on the O-ring.

SUMMARY OF THE INVENTION

I have now invented, and disclosed herein, certain new and novel apparatus which can be employed to translate the inner end of a split rim bead seat ring away from the bead seat of that rim before a tire mounted on the rim is inflated. This seats the bead ring on the gap-sealing O-ring surrounding the bead seat. It also allows the outer side wall and bead of the tire to expand toward the outer end of the rim as the tire is inflated.

In general, this novel apparatus includes two or more gripper devices. These are clamped to the outer flange ring of the rim at equidistantly spaced intervals therearound and connected through flexible members such as cables or chains to a prime mover. The prime mover may be the boom of a hydraulic hoist like that disclosed in the above-identified Collins and West et al. patents.

By pulling on the flexible connectors with the prime mover, one can relocate the outer flange ring and bead seat ring to positions relative to the bead seat in which the bead seat ring: (1) is seated on the gap sealing O-ring, and (2) does not interfere with the expansion of the tire as it inflated.

THE PRIOR ART

What the patentee identifies as "puller units" for tire changing equipment are disclosed in the above-cited Collins patent.

however, there is no suggestion in Collins that these units could be used for the purposes just discussed. Indeed, it would appear from the Collins patent that they are intended to be employed only in removing a tire from a split rim. Furthermore, Collins does not provide a positive connection between the puller units he discloses and the split rim components to which they are attached. As a result, his puller units would be apt to be both ineffective and dangerous to use. Finally, to use the patented puller units, the outer flange ring must be separated from an annular flange at the outer end of the bead seat ring so that a rim-associated component of the puller unit can be installed between the flange on the bead seat ring and the flange ring. To move these components apart would at best be very difficult, and this would furthermore require the manual labor which tire changing systems are designed to eliminate.

OBJECTS OF THE INVENTION

From the foregoing, it will be apparent to the reader that the primary object of the present invention resides in the provision of novel, improved methods of and apparatus for facilitating the inflation of tires mounted on split rims.

Other important objects and features and additional advantages of the invention will be apparent to the reader from the foregoing and the appended claims and as the ensuing detailed description and discussion proceeds in conjunction with the accompanying drawing.

DETAILED DESCRIPTION OF THE INVENTION

Figure 1:
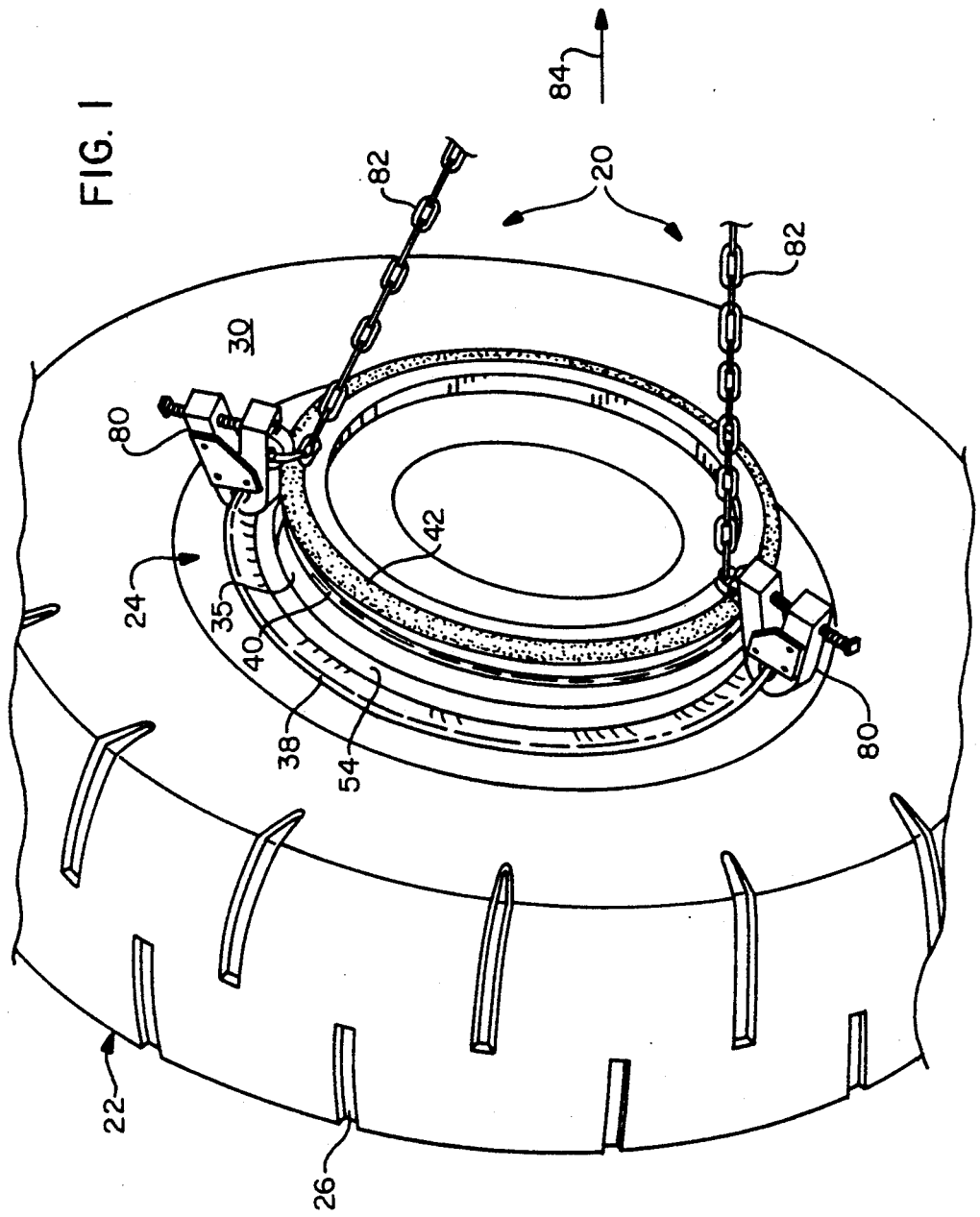
FIG. 1 is a pictorial view of a tire mounted on a split rim and ready to be prepared for inflation in accord with the principles of the present invention.
Figure 2:
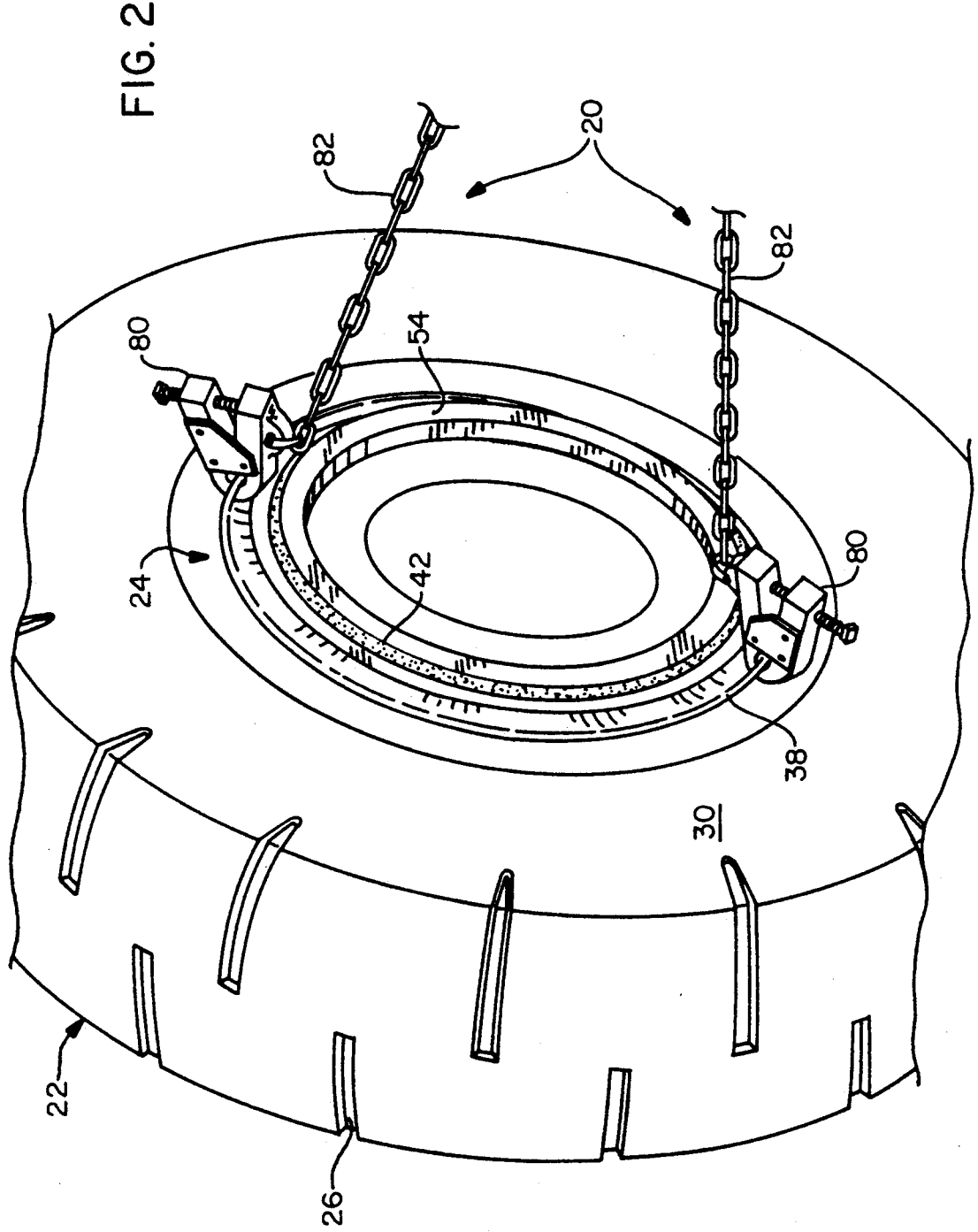
FIG. 2 is a view similar to FIG. 1 but with the tire ready for inflation.

Referring now to the drawing, FIGS. 1 and 2 depict a system 20 constructed in accord with the principals of the present invention and designed to promote the inflation of a tubeless tire 22 mounted on a split rim 24.

Tire 22 has the customary tread 26 and inner and outer side walls 28 and 30 terminating in integral beads 32 and 34.

The split rim 24 on which tire 22 is mounted includes: (1) a bead seat 35, (2) a bead seat ring 36, (3) inner and outer flange rings 37 and 38, (4) an O-ring 40, and (5) a locking ring 42, all of conventional construction. Bead seat 35 is an elongated, circularly sectioned, cylindrical component with an integral, outwardly directed, annular, flange ring-retaining stop or flange 46 at its inner end. The inner bead 32 of tire 22 is seated on bead seat 35 and butted against inner flange ring 37, which is trapped against bead seat flange 46. This arrangement keeps air from leaking past the inner bead 32 of the inflated tire.

Bead seat ring 36 is telescopically mounted on the outer section 48 of bead seat 35 with a gap 50 between the bead seat and the seat ring. The bead seat ring has a cylindrical, tapered, circularly sectioned main body section 52 and an outwardly directed, integral, flange 54 at the outer end of the main body section. The outer flange ring 38 is trapped against this flange. The outer bead 34 of tire 22 is seated on bead seat ring 36 and butted against outer flange ring 38 when the tire is inflated. That keeps air from leaking past the outer bead.

O-ring 40 surrounds and is seated in a groove 56 in bead seat 35 toward the outer end 48 of that split rim component. This O-ring spans the gap 50 between bead seat 35 and bead seat ring 36. Thus, O-ring 40 keeps air from leaking from the interior 58 of tire 22 to the ambient surroundings through the gap 50.

Figure 3:
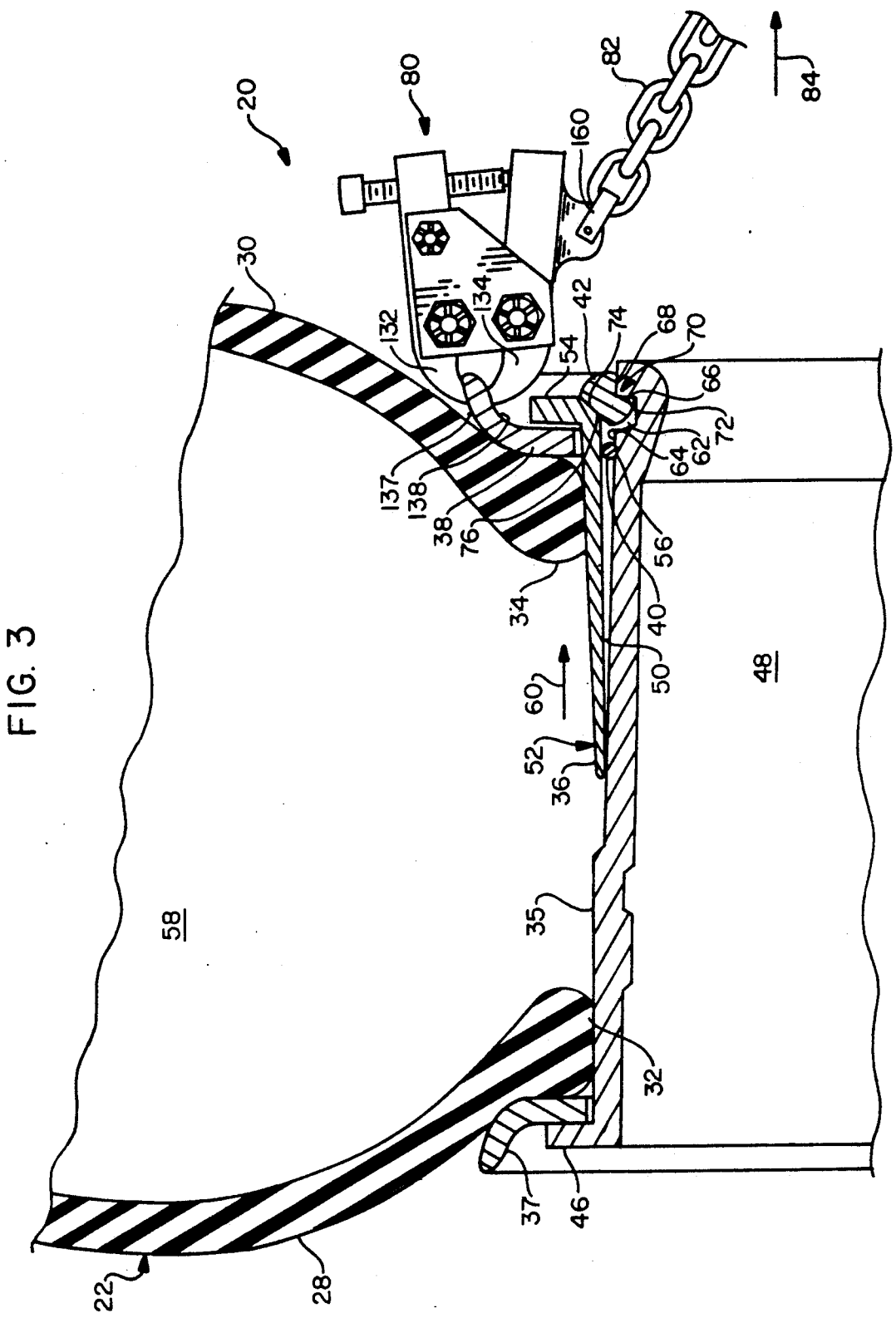
FIG. 3 is a section through a tire and the split rim on which it is mounted; this view also shows apparatus constructed in accord with the principles of the present invention and used to prepare the tire for inflation assembled to the split rim.

With tubeless tire 22 inflated, bead seat ring 36 is held in the operative relationship relative to bead seat 35 shown in FIGS. 3 by the force appurtenant to the pressure of the air in tire 22. This force acts in the direction indicated by arrow 60 to bias the outer bead 34 of tire 22 against outer flange ring 38, the latter against the radial flange 54 on bead seat ring 36, and the bead seat ring against locking ring 42.

Locking ring 42 will typically be supplied in segments which can be assembled into a complete circle. With bead seat ring 36 just short of the operative position shown in FIG. 3, the locking ring segments are installed in an annular groove 62. This groove surrounds, and opens on to the exterior peripheral surface 64 of, bead seat 35 toward the outer end 48 of that component. With the locking ring segments seated and the tubeless tire 22 inflated, the vertical and horizontal sides 66 and 68 of a annular notch 70 in locking ring 42 respectively engage: (1) a vertical side 72 of the annular notch 62 in bead seat 35, and (2) the outer surface 64 of that component. A complementary surface 74 on bead seat ring 36 is butted against a tapered surface 76 or locking ring 42.

The tubeless tire 22 and split rim 24 just described are conventional, and they will therefore not be described in further detail herein except as is necessary for an understanding of the present invention.

Referring now primarily to FIGS. 1, 2, 4, and 5, it the function of the novel inflation facilitating system 20 identified above to displace bead seat ring 36 and outer flange ring 38 from the positions of those components shown in FIG. 1 to the position shown in FIG. 2 in which they lie just short of the positions they assume (shown in FIG. 3) after locking ring 42 is then installed and tire 22 inflated by pumping air into it. As discussed above, this mechanical displacement of bead seat ring 36 and outer flange ring 38 from their FIG. 1 positions to the FIG. 2 positions has two salutary effects. First, this seats the bead seat ring 36 over O-ring 40 so that air cannot subsequently leak to the ambient surroundings through the gap 50 between the bead seat ring and bead seat 35. Second, this prior-to-inflation shifting of bead seat ring 36 and outer flange ring 38 eliminates the interference with the expansion of tire 22 by outward movement of its outer bead 34 which might occur if the bed seat ring were left in its FIG. 1 position while air was pumped into tire 22 and the outer bead 34 of the tire consequentially biased outward in the direction shown by arrow 60 in FIG. 3 toward the location it assumes (also shown in that figure) when the tire is fully inflated.

The major components of system 20 are identical gripper devices 80 to which connecting elements such as the illustrated flexible chains 82 are attached. As discussed briefly above, chains 82 are intended to be attached, at their opposite ends (not shown), to a prime mover such as the boom of a conventional hydraulic hoist as illustrated in the above-cited Collins and West et al. patents. This allows generally equal forces with a vector acting in the direction of arrow 84 in FIG. 3 to be applied to gripper devices 80 to displace bead seat ring 36 and outer flange ring 38 from the positions of those components shown in FIG. 1 to the positions shown in FIG. 2.

Figure 4:
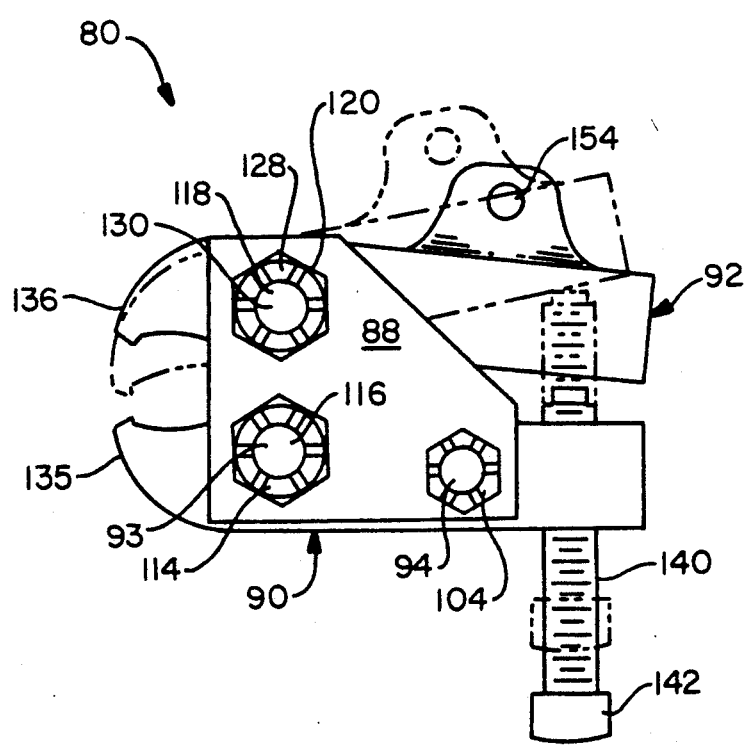
FIG. 4 is a side view of one of the multiple, tire gripper devices employed in the apparatus of FIG. 3.
Figure 5:
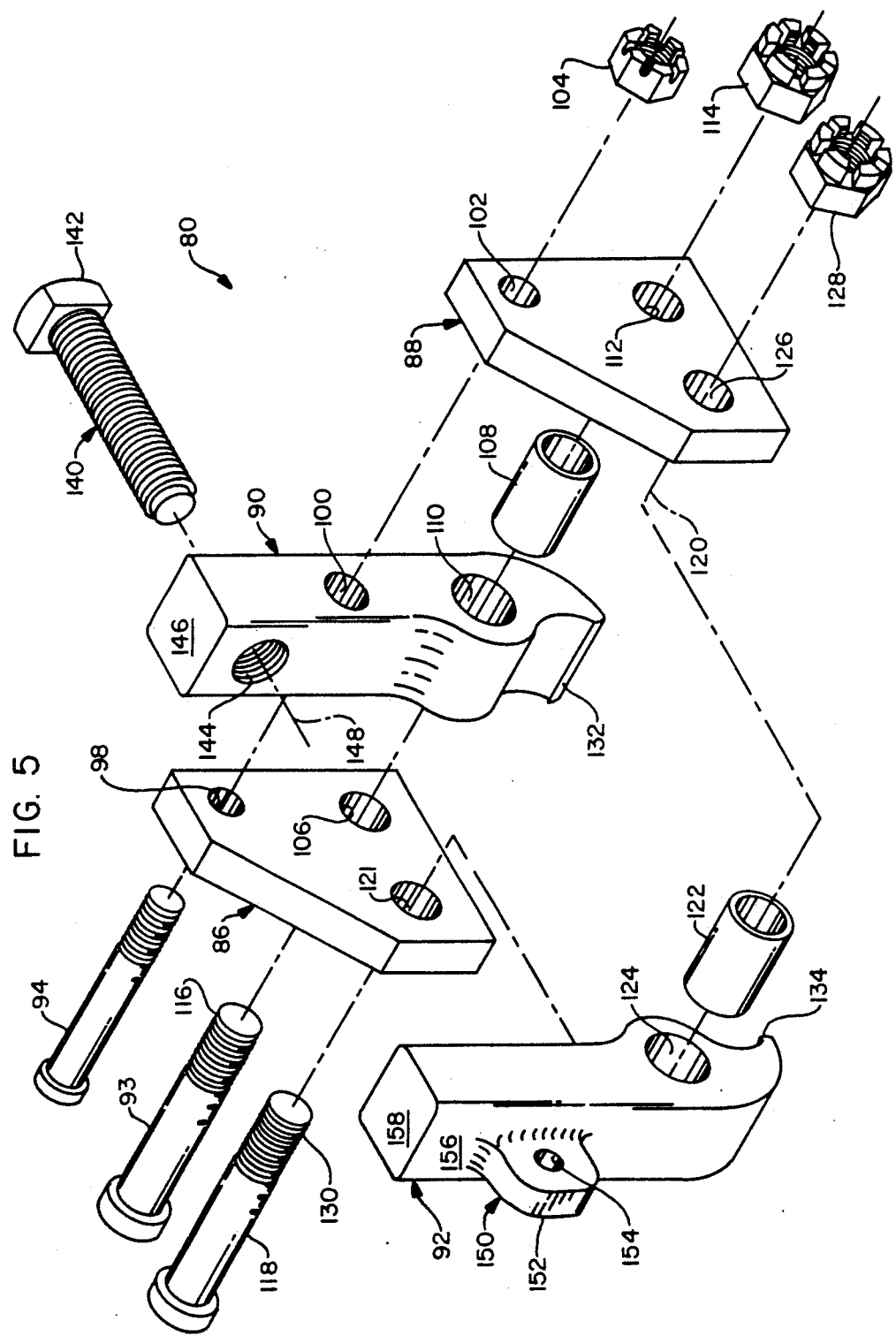
FIG. 5 is an exploded view of the gripper device.

Referring now most particularly to FIGS. 4 and 5, each of the gripper devices 80 has two platelike supports 86 and 88, a fixed jaw 90, and a movable or pivotable jaw 92.

Fixed jaw 90 is a elongated, barlike component. It spans, and is fixed between, supports 86 and 88 in an immovable relationship by bolts 93 and 94. Bolt 94 extends, seriatim, through apertures 98, 100, and 102 in support 86, fixed jaw 90, and support 88; and a lock nut 104 is threaded onto bolt 74 to clamp supports 86 and 88 against fixed jaw 90. Bolt 93 is similarly installed through an aperture 106 in support 86, a bushing 108 housed in an aperture 110 in fixed jaw 90, and an aperture 112 through support 88; and a lock nut 114 is tightened on the threaded end 116 of that bolt.

Movable jaw 92 is also an elongated barlike member. It is mounted on a third bolt 118 extending between supports 86 and 88 and in spaced relation to fixed jaw 90 for pivotable movement about an axis 120 extending normally to gripping device supports 86 and 88. Bolt 118 extends seriatim through an aperture 121 is support 86, a cylindrical bushing 122 disposed in an aperture 124 through pivotable jaw 92, and an aperture 126 through support 88. A lock nut 128 threaded on to its outer end 130 retains the installed bolt 118 in place.

Complementary, facing, gripping elements 132 and 134 in the form of narrow flats extending from one to the other of the side edges of fixed and movable jaws 90 and 92 are from the convex front to the concave rear thereof are provided at the opposite, working ends 135 and 136 of the fixed and movable, gripping device jaws.

As is perhaps best shown in FIG. 3, the gripping elements 132 and 134 at the working ends 135 and 136 of fixed and movable jaws 90 and 92 are designed to respectively engage the inner and outer surfaces 137 and 138 of a split rim outer flange ring such as that identified in the foregoing figure by reference character 38. A jack screw 140 with a head 142 to which a Crescent or other wrench can be attached is employed in each gripper device 20 to securely clamp outer flange ring 38 between gripping elements 135 and 136 and keep gripping device 80 from coming free when it is pulled on. Jack screw 140 is threaded through an internally threaded aperture 144 in that end 146 of fixed jaw 90 opposite working end 135. The jack screw extends toward movable jaw 92 along the axis 148 shown in FIG. 5. Backing off screw jack 140 as shown in Full lines in FIG. 4 allows the working ends 135 and 136 of fixed and movable jaws 90 and 92 to be spread apart and installed over outer flange ring 38. Thereafter advancing jack screw 140 to the phantom line position shown in the same figure pivots movable jaw 92 about axis 120 to the position shown in phantom lines in the same figure. That brings the working end 136 of movable jaw 92 toward the corresponding end 135 of fixed jaw 90 to securely clamp the outer flange ring 38 between the gripping elements 134 and 132 of the movable and fixed jaws.

An eye 150 consisting of an integral lug 152 with an aperture 154 therethrough is provided on the back side 156 and toward the outer or working end 136 of each movable, gripping device jaw 92. The inner ends 160 of chains 82 are trained through these apertures as shown in FIG. 3 to connect the chains to the gripping devices.

In operation, two (or more) gripping devices 80 of the character just described are assembled to the outer flange ring 38 of split rim 24 at equidistantly spaced intervals around the periphery of that ring. For example, two gripping devices 80 at 180° intervals as shown in FIGS. 1–3 may be employed. Thereafter, equal forces with vectors acting in the direction indicated by arrow 84 in FIG. 3 are exerted on the several chains 82; for example, by attaching the outer ends (not shown) of the chains to the above-mentioned hydraulic hoist boom. The exertion of this force is continued until seat ring 36 has slid over O-ring 40 and it and outer flange ring 38 are just short of their operative, FIG. 3 positions; i.e., in the positions shown in FIG. 2. Next, the segments of locking ring 42 are tapped in place. Air is then pumped into tubeless tire 22 to inflate it and slide flange ring 38 and bead seat ring 36 outwardly until flange ring 38 butts against the flange 54 on bead seat 35 to complete the process.

The invention may be embodied in other specific forms without departing from the spirit or essential characteristics thereof. The embodiment of that invention discussed above and illustrated in the drawings is therefore to be considered in all respects as illustrative and not restrictive. The scope of the invention is instead indicated by the appended claims, and all changes which come within the meaning and range of equivalency of the claims are therefore intended to be embraced therein.

What is claimed as the invention is:

1. The combination of tire rim, a tire mounted on said rim, and means including gripper devices at equally spaced intervals around said rim for facilitating the inflation of said tire:
   a. said rim including an annular bead seat; a first flange ring at an inner end of said seat; a sealing ring surrounding said bead seat at an outer end thereof; a bead seat ring having a radially extending flange at an outer end thereof, said bead seat ring being slidingly mounted on, and in telescoping relationship to, said bead seat; and a second flange ring trapped on said bead seat ring so that said second flange ring closely abuts said radially extending flange at said outer end of said bead seat ring, said second flange ring having a curved outer lip which projects in an outward direction;
   b. said tire having an inner bead butted against said first flange ring and an outer bead on said bead seat ring;
   c. each of said gripper devices comprising: a pair of parallel, spaced apart supports; a first, elongated jaw so fixed between and to said supports as to form therewith a rigid assembly in which said first jaw and said supports are immobilized relative to each other, said first jaw having at an inner end thereof means for engaging an outer side of said lip of said second flange ring; a second, elongated jaw, said second jaw having at an inner end thereof means for engaging an inner side of said lip of said second flange ring; means mounting said second jaw between said supports in spaced relationship to said first jaw and for rotation about a pivot axis extending from one to the other of said supports; and means for biasing said second jaw about said pivot axis towards said first jaw to clamp said lip of said second flange ring between said inner end of said first jaw and said inner end of said second jaw and thereby secure said device to said second flange ring, each said gripper device being configured so that said device is free to move together with said bead seat ring and said second flange ring to which said device is secured as said bead seat ring is slid telescopically on said bead seat from an inner position in which said bead seat ring is displaced inwardly from said sealing ring at said outer end of said bead seat to an outer position in which said bead seat ring is positioned over said sealing ring; and
   d. said means for facilitating the inflation of said tire further including force transmitting means assembled to said gripper devices and adapted to displace said second flange ring and said bead seat ring telescopically relative to said bead seat from said inner position to said outer position so as to: (a) seat said bead seat ring over said sealing ring, and (b) allow said tire to expand outwardly without interference as said tire is inflated with air.

2. A combination as defined in claim 1 in which each said gripper device has an eye on said pivotable second jaw to which said force transmitting means can be attached.

3. A combination as defined in claim 1 in which each said means for biasing said second jaw about said pivot axis towards said first jaw comprises a jack screw threaded through an outer end of said first jaw and extending toward said outer end of said second jaw.

4. A method of inflating a tire which has an outer bead and an inner bead and which is mounted on a rim having an annular bead seat; a first flange ring at an inner end of said seat; an annular sealing ring seated in said bead seat at an outer end thereof; a bead seat ring having a radially extending flange at an outer end thereof; said bead seat ring being slidingly mounted on, and in telescoping relationship to, said bead seat; and a second flange ring trapped on said bead seat ring so that said second flange ring closely abuts said radially extending flange at said outer end of said bead seat ring, said second flange ring having a curved outer lip which projects in an outward direction; said method comprising the steps of:
   a. positioning a plurality of gripper devices on said second flange ring at equidistantly spaced intervals around said rim, each said gripper device having support means, a first elongated jaw fixedly mounted to said support means and having an inner end configured to engage a first side of said lip of said second flange ring, a second elongated jaw pivotally mounted to said support means and having an inner end configured to engage a second side of said lip of said second flange ring, and means for biasing said inner end of said second jaw towards said inner end of said first jaw, said inner ends of said jaws of each said gripper device being positioned on opposite sides of said lip of said second flange ring;

b. employing said biasing means of each said gripper device to bias said inner end of second jaw towards said inner end of said first jaw so that said lip of said second flange ring is engaged between said inner ends of said jaws;

c. exerting substantially equal and symmetrical forces on said gripper devices which are in engagement with said second flange ring to displace said bead seat ring telescopically relative to said bead seat, said gripper devices moving together with said second flange ring and said bead seat ring as said bead seat ring is slid from an inner position in which said bead seat ring is displaced inwardly from said sealing ring at said outer end of said bead seat to an outer position in which said bead seat ring is positioned over said sealing ring, thereby seating said bead seat ring over said sealing ring and spacing said second flange ring away from said inner bead of said tire to remove potential interference with movement of said outer bead of said tire toward said outer end of said rim; and d. pumping air into said tire to inflate said tire.

5. A method of inflating a tire as defined in claim 4 in which said gripper devices are in engagement with said second flange ring with said fixed first jaws positioned on an outer side of said lip of second flange ring, and wherein said forces are exerted on said gripper devices by attaching force transmitting members to outer ends of said pivotally mounted second jaws of said gripper devices and pulling on said force transmitting members so that said pulling forces bias said inner ends of said pivotally mounted second jaws toward said inner ends of said fixedly mounted first jaws against said sides of said lip of said second flange ring.

* * * * *